(12) United States Patent
Suzuki et al.

(10) Patent No.: US 9,563,231 B2
(45) Date of Patent: Feb. 7, 2017

(54) ELECTRONIC DEVICE CAPABLE OF INPUT FROM A DETACHABLY ATTACHED DIGITIZER PANEL AND INPUT METHOD AND SYSTEM THEREFOR

(71) Applicant: LENOVO (Singapore) PTE, LTD., New Tech Park (SG)

(72) Inventors: Takayuki Suzuki, Tokyo (JP); Takehito Yamauchi, Ebina (JP); Yoshihisa Ishihara, Yamato (JP); Keita Ishikawa, Kawasaki (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/481,506

(22) Filed: Sep. 9, 2014

(65) Prior Publication Data

US 2015/0070310 A1 Mar. 12, 2015

(30) Foreign Application Priority Data

Sep. 10, 2013 (JP) ................................. 2013-187012

(51) Int. Cl.
*G06F 1/16* (2006.01)
*G06F 3/038* (2013.01)
*G06F 3/0354* (2013.01)
*G06F 3/046* (2006.01)
*G06F 3/041* (2006.01)

(52) U.S. Cl.
CPC ............. *G06F 1/1616* (2013.01); *G06F 3/038* (2013.01); *G06F 3/03545* (2013.01); *G06F 3/046* (2013.01)

(58) Field of Classification Search
CPC ...................................... G06F 1/1616
See application file for complete search history.

(56) References Cited

U.S. PATENT DOCUMENTS

| 4,514,688 A * | 4/1985 | Whetstone | G01B 7/004 178/18.02 |
| 5,579,487 A * | 11/1996 | Meyerson | G06F 1/1626 361/679.41 |
| 8,419,496 B1 * | 4/2013 | Smith | G02F 1/1333 445/25 |

(Continued)

FOREIGN PATENT DOCUMENTS

| JP | 63-0703326 | 3/1988 |
| JP | 06-161636 | 6/1994 |

(Continued)

*Primary Examiner* — Joseph Feild
*Assistant Examiner* — Karin Kiyabu
(74) *Attorney, Agent, or Firm* — Kunzler Law Group

(57) ABSTRACT

A digitizer panel for input with an electronic pen is detachably attached a laptop PC. The laptop PC includes a touch screen housed in a display housing. The display housing is formed of material having electromagnetic wave transmissivity such as GFRP or CFRP. On the back face of the display housing, an electromagnetic induction type digitizer panel can be detachably attached. The digitizer panel and the laptop PC are able to wirelessly communicate with each other. When the digitizer panel is attached, an electronic pen is brought close to the touch screen for input. When the digitizer panel is not attached, the electronic pen is directly brought close to the digitizer panel for input.

19 Claims, 6 Drawing Sheets

(56) References Cited

U.S. PATENT DOCUMENTS

| | | | |
|---|---|---|---|
| 2004/0131252 A1* | 7/2004 | Seto | G06F 3/03545 |
| | | | 382/179 |
| 2006/0044286 A1* | 3/2006 | Kohlhaas | G02F 1/13338 |
| | | | 345/173 |
| 2009/0179806 A1* | 7/2009 | Ji | G06F 1/1616 |
| | | | 343/702 |
| 2011/0297458 A1* | 12/2011 | Mao | G06F 3/03545 |
| | | | 178/19.04 |
| 2012/0313840 A1* | 12/2012 | Tsutsui | H04N 13/0454 |
| | | | 345/6 |
| 2013/0314337 A1* | 11/2013 | Asano | G06F 3/041 |
| | | | 345/173 |
| 2014/0019855 A1* | 1/2014 | Kim | G06F 3/04883 |
| | | | 715/268 |

FOREIGN PATENT DOCUMENTS

| | | | | |
|---|---|---|---|---|
| JP | 08-030368 | | 2/1996 | |
| JP | 2002-091612 | | 3/2002 | |
| JP | 2005-275381 | | 10/2005 | |
| JP | 2009-169498 | | 7/2009 | |
| TW | GB 2332524 A | * | 6/1999 | ......... G06F 3/03545 |

* cited by examiner

ELECTRONIC DEVICE CAPABLE OF INPUT FROM A DETACHABLY ATTACHED DIGITIZER PANEL AND INPUT METHOD AND SYSTEM THEREFOR

FIELD

The present application relates to techniques to a technique of expanding the use range of a digitizer panel and to a technique of enabling the digitizer panel to be used in a method matching a work environment.

BACKGROUND

A laptop personal computer (laptop PC) is sometimes equipped with a touch screen where a touch panel is combined with a display, as an input device, in addition to a keyboard and a mouse. The touch screen is a standard input device for a tablet terminal or a smartphone. The touch screen is operated with a finger by directly touching a screen itself or an object displayed on a screen and therefore is operable more intuitively and easily than moving a mouse cursor with a mouse, a Track Point®, or the like.

Furthermore, as another input device for a computer, there is a digitizer whose sensor panel is operated with an electronic pen. The digitizer is connected to a laptop PC through a wired or wireless interface, thereby enabling an operation by moving the mouse cursor displayed on the laptop PC with the electronic pen.

One electromagnetic induction type position detection device uses an input pen. In this position detection device, a plurality of sensor coils arranged on the coordinates sequentially repeats the transmission and reception of an electromagnetic wave to and from the input pen in which a resonance circuit is embedded. The sensor coil receives an electromagnetic wave oscillated by resonance through electromagnetic wave energy which the resonance circuit of the input pen received from the sensor coil and detects the position of the input pen and the pen pressure of the input pen from the intensity or phase thereof.

SUMMARY

In the case of an input from a digitizer for a conventional laptop PC, a sensor panel of the digitizer has been connected to an interface for external connection of the laptop PC or a transparent sensor panel has been integrally combined with a flat-panel type display such as an LCD or an organic EL and housed in a display housing. Moreover, in some cases, a display, a transparent touch panel operated with a finger, and a transparent sensor panel operated with an electronic pen are integrally combined with each other and housed in a display housing.

In this case, an input is allowed on the touch panel with a finger or an input is allowed on the sensor panel with an electronic pen according to need. Hereinafter, a structure of the display and the sensor panel combined with each other is referred to as a digitizer display, independently of the presence or absence of the touch panel. The input with an electronic pen enables a more detailed position to be pointed at than the input with a finger and therefore is suitable for an electronic device with a small screen such as a smartphone or for a fine work such as drawing. The input with an electronic pen, however, is not so popular in comparison with the touch panel. Therefore, if all laptop PCs are equipped with the digitizer display, the digitizer display is an excess function for users not requiring the function.

Moreover, the digitizer display may not be condusive to downsizing and weight reduction of a laptop PC. In the case of using the digitizer with the sensor panel of the digitizer connected to a laptop PC by wired or wireless communication, a direct operation is not allowed for an object displayed on the display inconveniently.

An electronic device according to the present invention includes a display; a housing having electromagnetic wave transmissivity for housing the display; a mounting structure for detachably mounting a digitizer panel on the back face of the housing; and an interface for communication with the digitizer panel. Furthermore, an electronic pen is brought close to the surface of the display for input to the digitizer panel. When the digitizer panel is not attached to the housing, the electronic pen can be brought close directly to the digitizer panel placed around the electronic device for input.

The electronic device enables input by pointing at an object displayed on the display with attachment of the digitizer panel when needed, without digitizer functions embedded in the display, thereby expanding the use range of the digitizer panel. Moreover, the electronic device is not equipped with the digitizer functions, and therefore thickness reduction and weight reduction can be achieved. The digitizer panel may have an electromagnetic induction type sensor coil. Moreover, the electronic pen may be of a battery non-equipped type. The display may be formed of a touch screen including a touch panel function.

The electronic device may be a laptop personal computer with the housing openable/closable through a hinge mechanism. In this condition, the mounting structure of the digitizer panel may include magnets and the hinge mechanism. The housing having electromagnetic wave transmissivity may include one or both of a panel formed of carbon fiber-reinforced resin (CFRP) and a panel formed of glass fiber-reinforced resin (GFRP). An input system for an electronic device according to the present invention includes a display; a housing having electromagnetic wave transmissivity for housing the display; a digitizer panel mounted on the back face of the housing so as to enable an operation with an electronic pen from the surface of the display; and an interface for communication with the digitizer panel.

The present invention also provides a method of input to a computer which includes a display housed in a housing formed of material having electromagnetic wave transmissivity. After a digitizer panel is attached to the back face of the housing, an electronic pen is brought close to the surface of the display, and the digitizer panel detects the coordinates of a coil array to which the electronic pen is brought close, the digitizer panel then transmits the coordinates of the coil array to the computer. The digitizer panel can be attached to the back face of the housing for an operation with the electronic pen from the surface of the display or be placed around the computer for operation. Therefore, a user is able to use the digitizer panel properly according to the environment.

Reference marks for alignment with the digitizer panel may be displayed on the display when the attachment of the digitizer panel is detected after the communication between the computer and the digitizer panel is established. This enables matching between the display and the digitizer panel in coordinates by pointing at the reference marks with the electronic pen when the communication is established. Moreover, the computer may automatically recognize the size of the digitizer panel in response to the detection of the attachment of the digitizer panel, which facilitates attachment of digitizer panels of various sizes.

The present invention enables the provision of an electronic device which can be used with a digitizer panel attached when needed. Furthermore, the present invention enables the provision of an input system equipped with a digitizer panel. Still further, the present invention enables the provision of a method which allows a digitizer panel to be used in an appropriate manner according to an environment.

BRIEF DESCRIPTION OF THE DRAWINGS

In order that the advantages of the application will be readily understood, a more particular description of the application briefly described above will be rendered by reference to specific embodiments that are illustrated in the appended drawings. Understanding that these drawings depict only typical embodiments of the application and are not therefore to be considered to be limiting of its scope, the application will be described and explained with additional specificity and detail through the use of the accompanying drawings, in which.

DETAILED DESCRIPTION

Figure 1A:
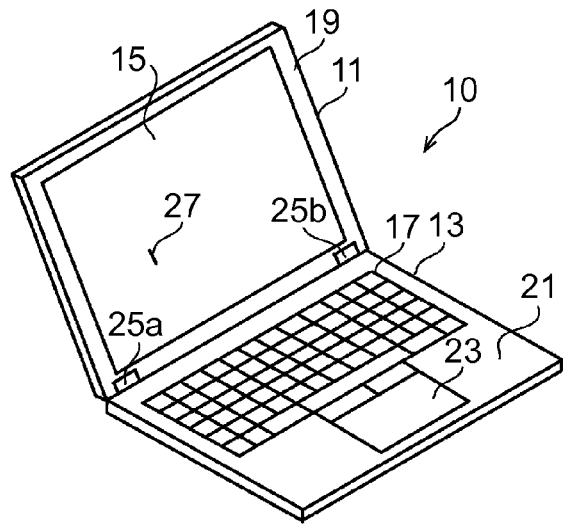
FIG. 1A-1C is a perspective view illustrating an external shape of a laptop PC and that of a digitizer panel.
Figure 1B:
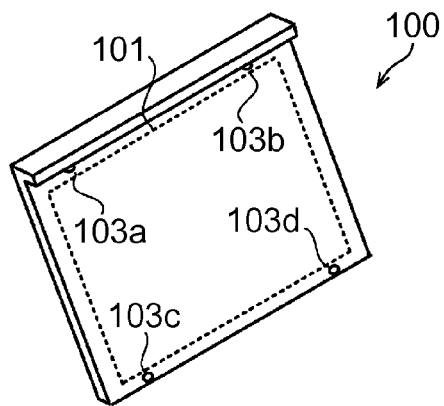
Figure 1C:
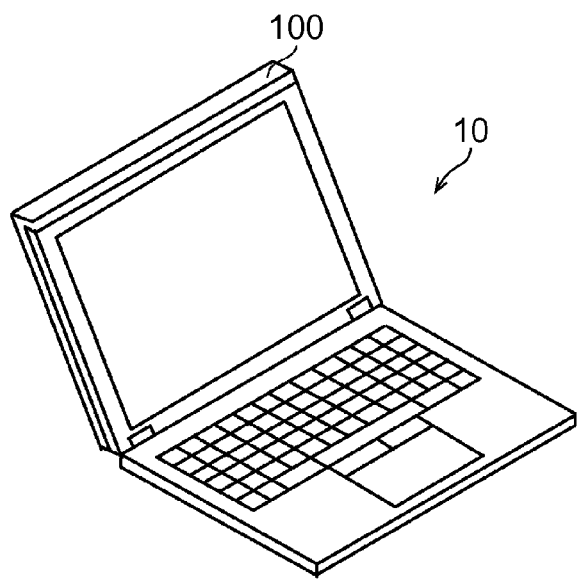

FIG. 1 is a perspective view illustrating an external shape of a laptop PC and that of a digitizer panel. FIG. 1A illustrates a laptop PC 10, FIG. 1B illustrates an electromagnetic induction type digitizer panel 100, and FIG. 1C illustrates a state where the digitizer panel 100 is attached to the laptop PC 10. The laptop PC 10 includes a display housing 11 and a system housing 13 coupled to each other via hinge mechanisms 25a and 25b so as to be openable and closable. The hinge mechanisms 25a and 25b are formed of metal.

Figure 3:
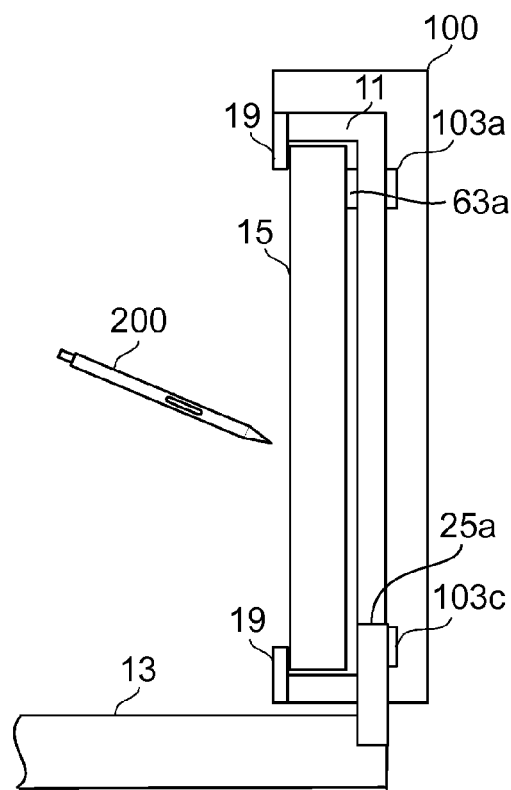
FIG. 3 is a sectional view of the laptop PC with the digitizer panel attached thereto.

The display housing 11 houses a touch screen 15 in the inside thereof with a decorative panel 19 attached around the touch screen 15. The touch screen 15 is made by embedding touch panel functions of various types such as an electrostatic capacitance type, a resistance film type, or an optical type into a liquid crystal display panel and has a known general structure of transmitting an electromagnetic wave transmitted or received between the digitizer panel 100 and an electronic pen 200 (FIG. 3).

Moreover, as long as the display is of a type transmitting the electromagnetic wave used by the digitizer panel 100, it is also possible to employ another flat-panel type display such as an organic EL display, instead of the liquid crystal display. For the structure of the touch screen, it is possible to employ both of an external type where a touch panel is pasted on the external surface of the liquid crystal display and a built-in type, called in-cell or on-cell, where the touch panel functions are embedded in the display.

In the present invention, a flat-panel type display without a touch panel function can also be employed, instead of the touch screen 15. On the touch screen 15, a mouse cursor 27 is displayed on the liquid crystal display. The system housing 13 houses system devices such as a CPU, a motherboard, and an SSD inside, while having a keyboard 17, a palm rest 21, a touch pad 23, and the like arranged on the surface.

Figure 4:
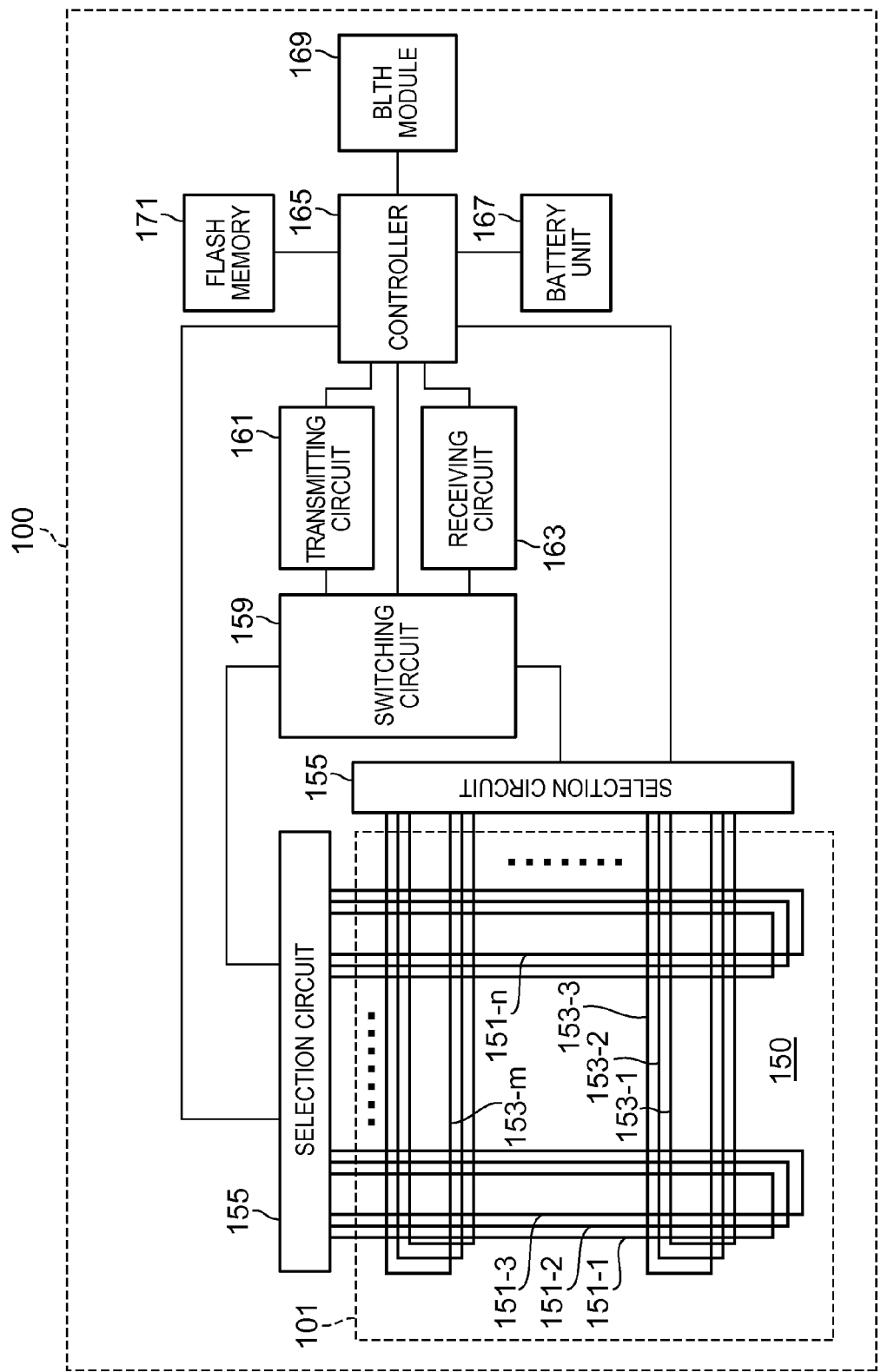
FIG. 4 is a functional block diagram of the digitizer panel.

The digitizer panel 100 detects the position of the electronic pen by using an electromagnetic wave oscillated by sensor coils. On the digitizer panel 100, there is mounted a coil array 101 whose coil pattern is formed by photolithography on a circuit board. Furthermore, as illustrated in FIG. 4, a wireless interface, a control circuit of the coil array 101, a power circuit, and the like are mounted around the coil array 101 or on the rear face of the circuit board. An acrylic panel is pasted on the surface of the coil array 101. Magnets 103a to 103d are attached to the digitizer panel 100 as an example of an attachment structure for attachment to the back face of the display housing 11.

The digitizer panel 100 is normally detached from the laptop PC 10 and, when used, the digitizer panel 100 can be attached to the back face of the display housing 11 by using the magnets 103a to 103d so as to be easily detachable. The digitizer panel 100 is formed in an L shape as an example so as to enable physical alignment in the vertical direction relative to the touch screen 15 on the upper side end of the display housing 11 and to enable free arrangement in the horizontal direction within a range where the magnets 103a to 103d can attract the digitizer panel 100. Therefore, a digitizer panel of various sizes can be attached to the display housing 11.

Figure 2:
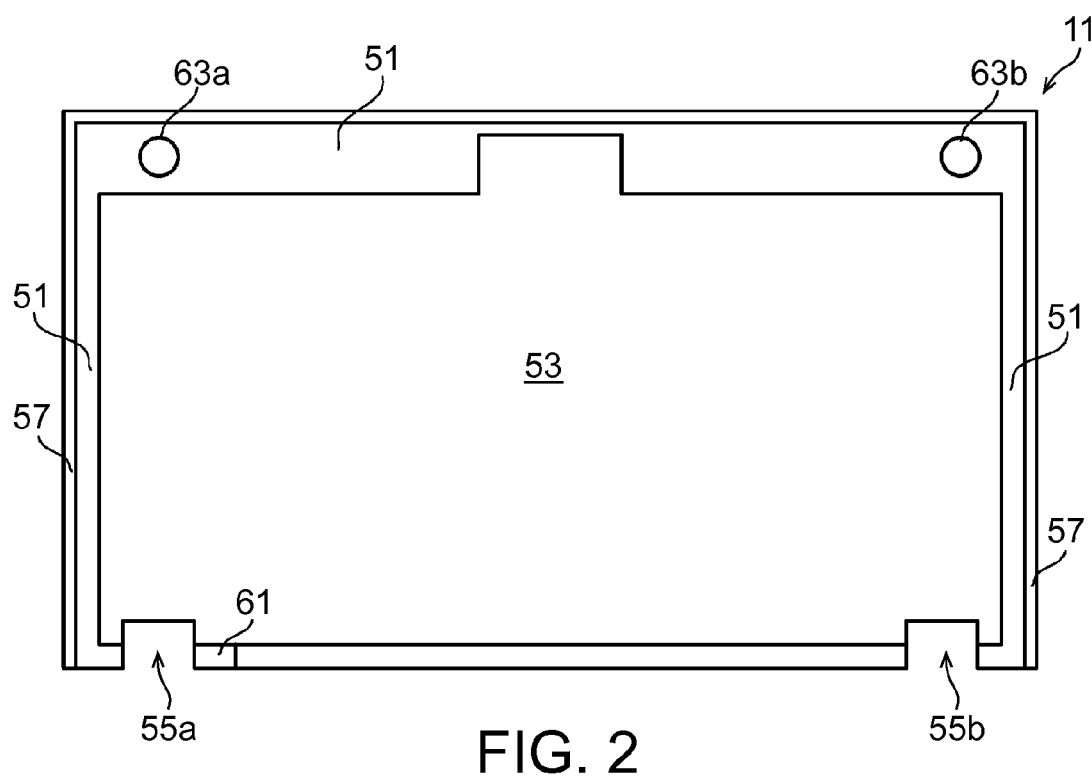
FIG. 2 is a plan view of a display housing.

FIG. 2 is a plan view of the display housing 11 in a state where the touch screen 15 and the decorative panel 19 are detached. FIG. 3 is a sectional view of the laptop PC with the digitizer panel 100 attached to the display housing 11 in which the touch screen 15 is housed. The display housing 11 is formed of two areas: an area 51 of glass fiber-reinforced resin (GFRP) which is a nonconductive material and an area 53 of carbon fiber-reinforced resin (CFRP) which is a conductive material. Both GFRP and CFRP include nylon as base material and have electromagnetic wave transmissivity for at least an electromagnetic wave used by the digitizer panel 100.

The GFRP area 51 constitutes a peripheral portion of the display housing 11 and a sidewall 57 for forming the inside into a box shape. On the upper side of the GFRP area 51, an antenna of wireless LAN, Bluetooth®, or the like is to be arranged. The CFRP area 53 constitutes the central portion of the display housing 11 and dominates the entire area. On the upper side of the CFRP area 53, a camera is to be mounted. Moreover, magnets 63a and 63b and a proximity sensor 61 are mounted on the GFRP area 51.

On the lower side of the display housing 11, there are formed cutouts 55a and 55b so that the hinge mechanisms 25a and 25b are fitted into the cutouts 55a and 55b. When the digitizer panel 100 is arranged on the back face of the display housing 11, the magnets 103a and 103b and the magnets 63a and 63b attract each other and the magnets 103c and 103d attract the hinge mechanisms 25a and 25b, by which the digitizer panel 100 can be fixed so as not to separate in a use state and can separate with a little force when not used. Instead of the hinge mechanisms 25a and 25b, magnets for fixing may be provided in the positions matching the magnets 103c and 103d in the GFRP area 51. The digitizer panel 100 is able to be attached in a state where the display housing 11 is closed and therefore can be carried integrally with the laptop PC 10.

In a state where the digitizer panel 100 is not attached to the display housing 11, an input to the digitizer panel 100 is enabled by bringing the electronic pen 200 close to or placing the electronic pen 200 in contact with the surface of the digitizer panel 100. Moreover, the touch screen 15 and the display housing 11 transmit the electromagnetic wave transmitted or received between the electronic pen 200 and the coil array 101 and therefore, in the state where the digitizer panel 100 is attached to the display housing 11, an input is enabled by bringing the electronic pen 200 close to or placing the electronic pen 200 in contact with the surface of the touch screen 15. For the display housing 11, other materials containing nonmetallic material can be used, too.

FIG. 4 is a functional block diagram for describing an example of the configuration of the digitizer panel 100. The digitizer panel 100 has a transmission mode and a reception mode and includes the coil array 101 in which there are formed sensor coils 151-1 to 153-$m$ utilizing electromagnetic wave interference with the electronic pen 200 of a type not requiring a power supply. The electronic pen 200 includes an L-C resonance circuit formed by a coil and a capacitor. The operation of the electronic pen 200 includes an up operation, a down operation, and a pen pressure operation.

The up operation is an operation of positioning the electronic pen 200 in a position where the digitizer panel 100 cannot detect an input due to electromagnetic wave interference. The down operation is an operation of positioning the electronic pen 200 in a position where the digitizer panel 100 can detect an input. The pen pressure operation is an operation of pressing the tip of the electronic pen 200 against the surface of the touch screen 15 or the digitizer panel 100. For example, it is possible to perform the down operation even in a position separated by about 11 millimeters from the sensor coils 151-1 to 153-$m$ with the display housing 11 and the touch screen 15 between the electronic pen 200 and the digitizer panel 100.

The resonance circuit of the electronic pen 200 includes a variable capacitor which varies in the capacity according to the pressure applied when the pen tip depresses the surface of the touch screen 15, thereby enabling information corresponding to the pen pressure applied when drawing on paper with a pen or mouse click information to be detected by a change in a phase difference of an excitation current in the transmission mode and an induced voltage in the reception mode. The electronic pen 200 also includes a side button for inputting a signal corresponding to a mouse click by changing the resonance frequency of the resonance circuit.

The coil array 101 includes n sensor coils 151-1 to 151-$n$ which are arranged at equal pitches so as to be sequentially superposed on each other in the X-axis direction and m sensor coils 153-1 to 153-$m$ which are arranged at equal pitches so as to be sequentially superposed on each other in the Y-axis direction. The selection circuit 155 sequentially selects the sensor coils 151-1 to 153-$m$ one by one on the basis of a selection signal received from the controller 165 and forms a loop circuit which goes through a transmitting circuit 161 or a receiving circuit 163 via a switching circuit 159.

The switching circuit 159 alternately switches the loop circuit between the transmitting circuit 161 and the receiving circuit 163 multiple times at predetermined time intervals during a period in which a predetermined sensor coil is selected according to a selection signal on the basis of the switching signal received from the controller 165. An operational state during which the switching signal selects the transmitting circuit 161 is referred to as a transmission mode (transmission period), while an operational state during which the switching signal selects the receiving circuit 163 is referred to as a reception mode (reception period).

The controller 165 generates the switching signal so as to form a plurality of transmission periods and reception periods while selecting one sensor coil. The transmitting circuit 161 supplies the selected sensor coil with high-frequency excitation current during the transmission period. The sensor coil into which the excitation current flows radiates an electromagnetic wave. The coil of the electronic pen 200, for which the down operation, the pen pressure operation, or the side button depression has been performed, resonates with an electromagnetic wave, by which current flows into the resonance circuit.

The current flowing in the resonance circuit radiates an electromagnetic wave from the coil of the electronic pen 200. The electromagnetic wave radiated from the coil of the electronic pen 200 is received by the same sensor coil during the reception period subsequent to the transmission period. The receiving circuit 163 converts the induced voltage of the sensor coil, which has been detected during the reception period, to digital data and transmits the converted digital data to the controller 165. The induced voltage increases as a distance between the sensor coil and the electronic pen 200 is smaller. Therefore, the controller 165 is able to generate coordinate information by identifying a sensor coil existing in a position closest to the electronic pen 200 by detecting the induced voltages of the respective sensor coils sequentially selected during a period in which the electronic pen 200 is positioned in certain coordinates.

The controller 165 generates the switching signal and the selection signal and generates coordinate information from the induced voltage of the sensor coil. When the electronic pen 200 is pressed against the surface of the touch screen 15 or the digitizer panel 100 by the pen pressure operation, the capacity of the variable capacitor of the electronic pen 200 changes, thereby changing the frequency of the current flowing in the resonance circuit. The controller 165 calculates the frequency of the excitation current transmitted during the transmission period and the frequency of the induced voltage detected during the reception period and generates pen pressure information of the electronic pen 200.

The controller 165 sends the coordinate information and the pen pressure information through a Bluetooth® module (BLTH module) 169 or through a wired interface, which is not illustrated, to an I/O controller of the laptop PC 10. A battery unit 167 supplies electric power to the digitizer panel 100. A flash memory 171 stores device information of the digitizer panel 100. The digitizer panel may be of a type where the electronic pen is equipped with a battery and a transmission coil to transmit an electromagnetic wave. The digitizer panel in this case is able to recognize the coordinates of the electronic pen only by the receiving circuit 163.

Figure 5A:
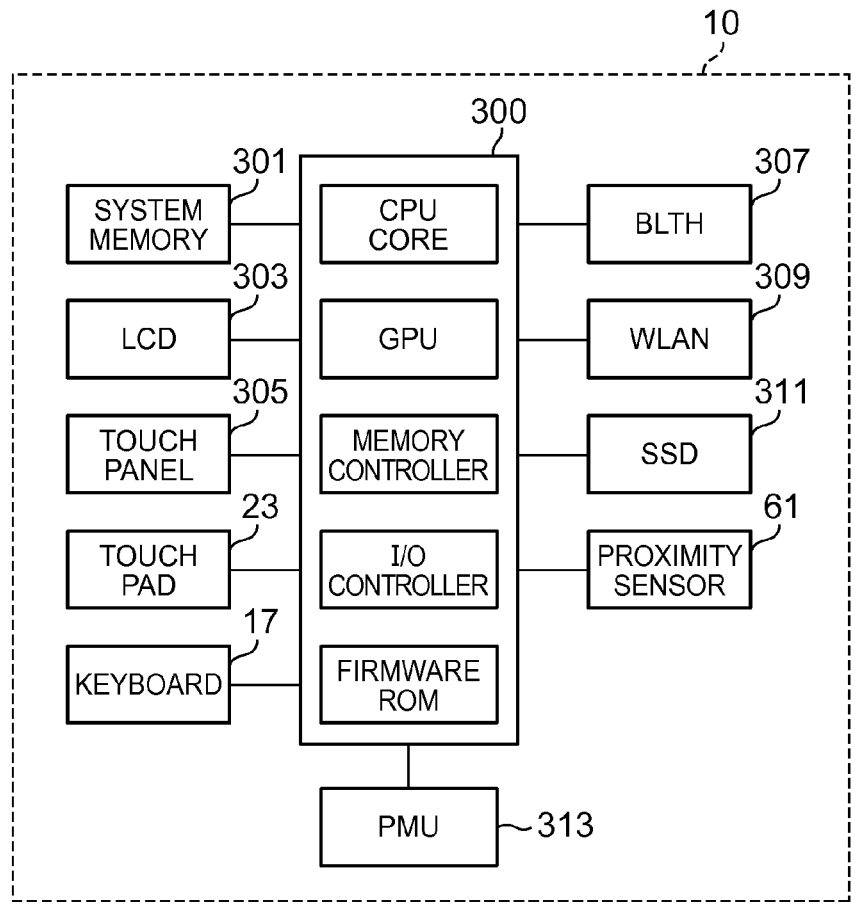
FIG. 5A-5B is a functional block diagram of the laptop PC.
Figure 5B:
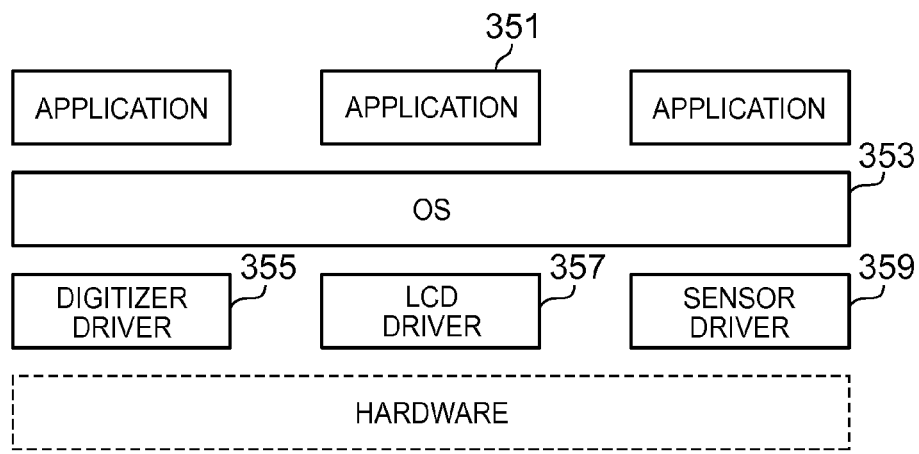

FIG. 5 is an outline functional block diagram for describing an example of the configuration of the laptop PC 10. FIG. 5A illustrates a hardware configuration and FIG. 5B illustrates a software configuration. In the laptop PC 10, there are connected a system memory 301, a liquid crystal display 303 constituting a touch screen 15, a touch panel 305 constituting the touch screen 15, the touch pad 23, the keyboard 17, the Bluetooth® module (BLTH module) 307, a Wireless Local Area Network (WLAN) module 309, an SSD 311, the proximity sensor 61, a power management unit (PMU) 313, and the like to an embedded system 300 of an SOC (system on a chip) type.

The embedded system 300 includes a CPU core, a GPU, a memory controller, an I/O controller, a firmware ROM, and the like. The SSD 311 stores an application program 351 executed by each CPU core, an operating system 353, a digitizer driver 355 which is a device driver of the digitizer panel 100, an LCD driver 357 which is a device driver of the LCD 303, a sensor driver 359 which is a device driver of the proximity sensor 61, and the like. The proximity sensor 61 detects the magnetism of the magnet 103c when the digitizer panel 100 is attached to the back face of the display housing 11 before operation.

Figure 6:
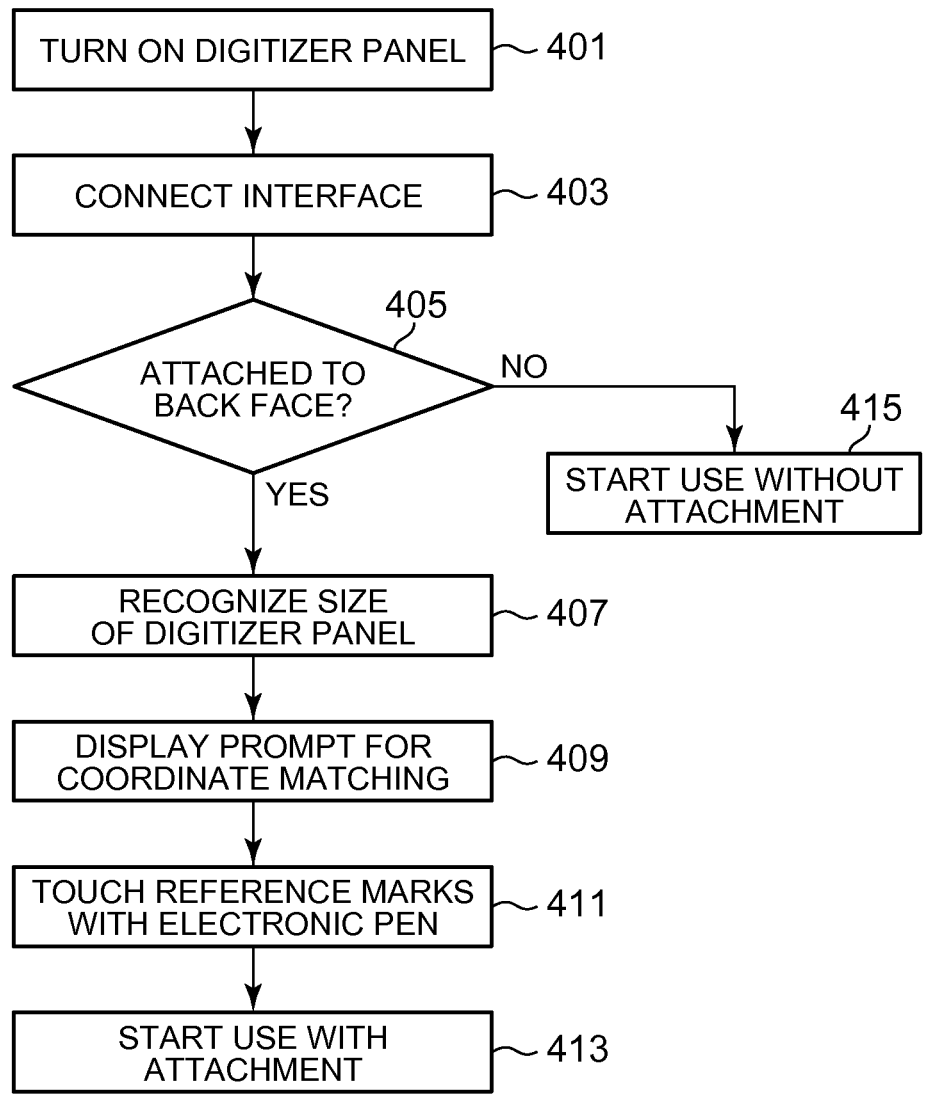
FIG. 6 is a flowchart for describing a procedure for input to a computer using the digitizer panel.

FIG. 6 is a flowchart for describing a method of input to the laptop PC 10 using the digitizer panel 100. In block 401, a user operates the BLTH module 307 of the laptop PC 10 to place the laptop PC 10 in a connection mode. When the user turns on the power supply of the digitizer panel 100, the BLTH module 169 automatically enters the connection mode. The BLTH module 307 of the laptop PC 10 and the BLTH module 169 of the digitizer panel 100 are previously completed to be registered (pairing). The BLTH module 307, which has entered the connection mode, searches for the BLTH module 169 which has entered the connection mode and automatically establishes the connection in block 403.

In block 405, if the digitizer panel 100 is attached to the back face of the display housing 11, the proximity sensor 61 operates. Upon receiving the operation event from the sensor driver 359, the digitizer driver 355 recognizes that the digitizer panel 100 is attached to the back face and proceeds to block 407. Unless the digitizer panel 100 receives the operation event, the control proceeds to block 415.

In block 415, as is conventionally performed, the digitizer panel 100 placed within the Bluetooth® communication range is able to be operated with the electronic pen 200. In this condition, the mouse cursor 27 is moved by moving the electronic pen 200 while performing the down operation, thereby enabling an input by the pen pressure operation or the side button operation. Moreover, characters can be input in handwriting with the electronic pen 200 by executing a predetermined application program.

In block 407, the digitizer driver 355 acquires the size of the coil array 101 from the device information of the digitizer panel 100 stored in the flash memory 171 through the attached BLTH module 169 and then notifies the LCD driver 357. The LCD driver 357 displays reference marks in predetermined coordinates of the touch screen 15 so as to be adaptable to the received size and then prompts a user to point at the reference marks with the electronic pen 200. The reference marks are displayed at the four corners of the touch screen 15 so as to enable the effective range of the digitizer panel 100 to be confirmed.

Figure 7A:
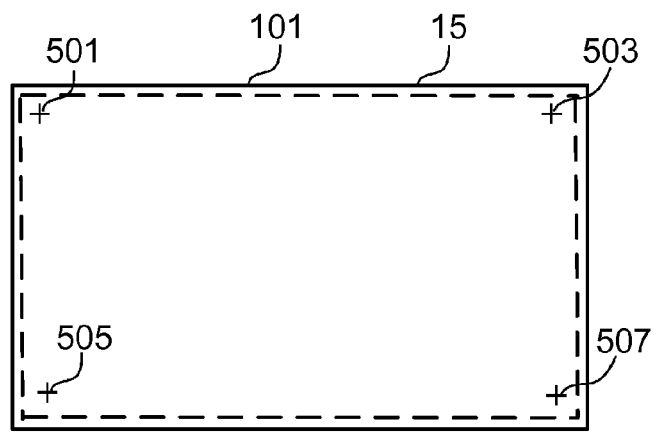
FIG. 7A-7C is a diagram for describing the states of displaying reference marks on a touch screen.
Figure 7B:
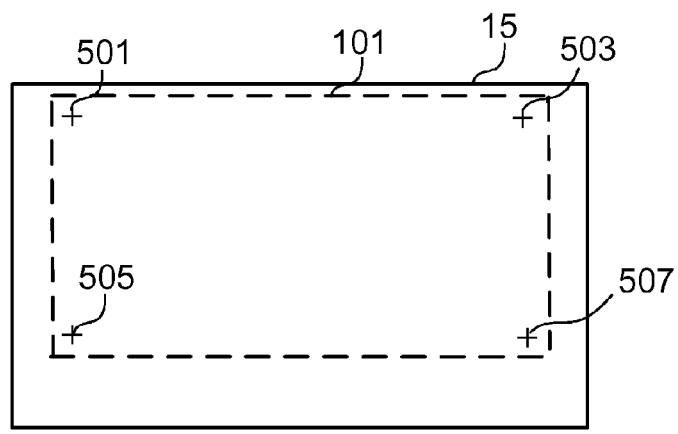
Figure 7C:
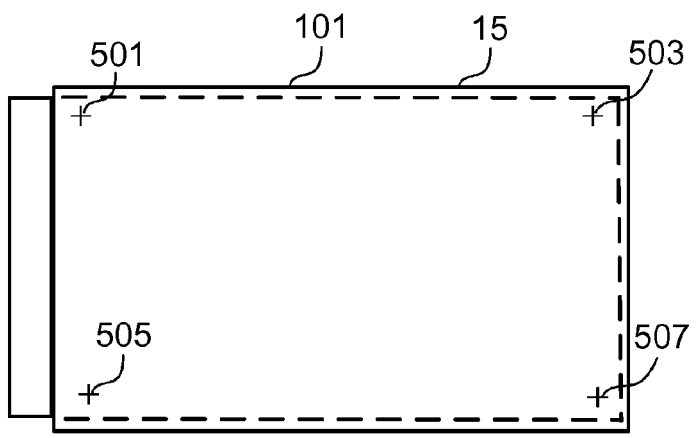

FIG. 7 is a diagram for describing the states of displaying the reference marks on the touch screen 15. FIG. 7A illustrates the case where the size of the touch screen 15 is substantially equal to the size of the coil array 101. FIG. 7B illustrates the case where the size of the coil array 101 is smaller. FIG. 7C illustrates the case where the size of the coil array 101 is larger. If the size of the coil array 101 is smaller, an input to a part of the area of the touch screen 15 cannot be performed with the electronic pen.

In the above situation, the LCD driver 357 or the OS 353 may change the resolution of the screen and the display position according to the size of the coil array 101. When the size of the coil array 101 is larger, a part of the area of the coil array 101 is unavailable, while an input is enabled for the entire display area of the touch screen 15. If the user points at the reference marks 501 to 507 with the electronic pen 200 in block 411, the digitizer driver 355 recognizes a relationship between the coordinates of the screen and the coordinates of the coil array 101.

Therefore, when the touch screen 15 is pointed at with the electronic pen 200, the digitizer driver 355 is able to recognize the coordinates of the touch screen 15, which is pointed at, from the coordinates detected by the digitizer panel 100 and to transmit the coordinates to the system. In block 413, the user performs an input for an object on the touch screen 15 with the electronic pen 200. When the digitizer panel 100 is attached to the back face, an input can also be performed through the mouse cursor 27 in the same manner as in block 415.

While the present invention has been described by using a particular embodiment illustrated in the accompanying drawings, the present invention is not limited to the embodiment illustrated in the drawings, and naturally any conventionally known configuration may be used as long as the effect of the present invention is achieved.

What is claimed is:

1. An electronic device, comprising:
   a display;
   a housing having electromagnetic wave transmissivity for housing the display;
   a mounting structure for detachably mounting a digitizer panel on the back face of the housing, wherein a size of a coil array of the digitizer panel is wirelessly transmitted to the electronic device responsive to the digitizer panel being attached to the back face of the housing, and one or more of a resolution and a position of the display are adjusted based on the size of the coil array; and
   an interface through which coordinates are received from the digitizer panel responsive to detecting an electronic pen positioned in proximity of the surface of the display, the coordinates received wirelessly over a short-range wireless communication interface.

2. The electronic device of claim 1, wherein the digitizer panel has an electromagnetic induction type sensor coil.

3. The electronic device of claim 2, wherein the electronic pen is not equipped with a power supply.

4. The electronic device of claim 1, wherein the display is formed of a touch screen including a touch panel function.

5. The electronic device of claim 1, wherein the electronic device is a laptop personal computer with the housing openable and closable through a hinge mechanism.

6. The electronic device of claim 5, wherein the mounting structure includes magnets and the hinge mechanism.

7. The electronic device of claim 1, wherein the housing includes a panel formed of carbon fiber-reinforced resin (CFRP).

8. The electronic device of claim 1, wherein the housing includes a panel formed of glass fiber-reinforced resin (GFRP).

9. An input system, comprising:
   a display;
   a housing having electromagnetic wave transmissivity for housing the display;
     a digitizer panel mounted on the back face of the housing, wherein a size of a coil array of the digitizer panel is wirelessly transmitted to the input system responsive to the digitizer panel being attached to the back face of the housing, and one or more of a resolution and a position of the display are adjusted based on the size of the coil array;
   an interface for communication with the digitizer panel; and
   an electronic pen, wherein coordinates are received from the digitizer panel responsive to detecting the electronic pen positioned in proximity to the surface of the display, the coordinates received wirelessly over a short-range wireless communication interface.

10. The input system of claim 9, wherein the digitizer panel has an electromagnetic induction type sensor coil.

11. The input system of claim 9, wherein the electronic pen is not equipped with a power supply.

12. The input system of claim 9, wherein the display is formed of a touch screen including a touch panel function.

13. The input system of claim 9, wherein the electronic device is a laptop personal computer with the housing openable and closable through a hinge mechanism.

14. The input system of claim 13, further comprising a mounting structure that includes magnets and the hinge mechanism.

15. The input system of claim 9, wherein the housing includes a panel formed of carbon fiber-reinforced resin (CFRP).

16. The input system of claim 9, wherein the housing includes a panel formed of glass fiber-reinforced resin (GFRP).

17. A method comprising:
- recognizing, by a processor, that a digitizer panel is attached to the back face of a housing of an electronic device formed of material having electromagnetic wave transmissivity, the housing of the electronic device comprising a display;
- determining a size of a coil array of the digitizer panel responsive to the digitizer panel being attached to the back face of the housing of the electronic device, the size of the coil array wirelessly transmitted to the electronic device;
- adjusting one or more of a resolution and a position of the display based on the size of the coil array;
- detecting coordinates on the coil array responsive to an electronic pen being positioned within a proximity of the display; and
- transmitting the coordinates detected on the coil array, the coordinates detected on the coil array transmitted wirelessly over a short-range wireless communication interface.

18. The method of claim 17, further comprising:
- establishing communication between a computer and the digitizer panel;
- detecting the attachment of the digitizer panel; and
- displaying reference marks for alignment with the digitizer panel on the display.

19. The method of claim 17, wherein the coordinates detected on the coil array are detected through the housing of the electronic device.

* * * * *